Nov. 22, 1932.　　W. A. ANDERSON　　1,888,255
AUTOMATIC MOLDING MECHANISM FOR PLASTIC MATERIAL
Filed Oct. 5, 1929　　9 Sheets-Sheet 4

INVENTOR.
William A. Anderson
BY
ATTORNEYS.

INVENTOR.
William A. Anderson
BY
ATTORNEYS.

Nov. 22, 1932.  W. A. ANDERSON  1,888,255
AUTOMATIC MOLDING MECHANISM FOR PLASTIC MATERIAL
Filed Oct. 5, 1929  9 Sheets-Sheet 7

INVENTOR.
William A. Anderson
BY
ATTORNEYS.

Nov. 22, 1932.  W. A. ANDERSON  1,888,255
AUTOMATIC MOLDING MECHANISM FOR PLASTIC MATERIAL
Filed Oct. 5, 1929   9 Sheets-Sheet 8

INVENTOR.
William A. Anderson
BY
ATTORNEYS.

Patented Nov. 22, 1932

1,888,255

UNITED STATES PATENT OFFICE

WILLIAM A. ANDERSON, OF HUNTINGTON PARK, CALIFORNIA

AUTOMATIC MOLDING MECHANISM FOR PLASTIC MATERIAL

Application filed October 5, 1929. Serial No. 397,538.

This invention relates to molding mechanisms, and the principal object is to provide an automatic continuously operable molding mechanism for plastic materials such as glass, plaster, and other materials.

My invention comprehends the provision of a self-contained molding mechanism embodying a plurality of molding units preferably arranged concentrically about an axis mounted on a truck or bed whereby the mechanism may be adjusted relative to a source of supply for the molds, and means for continuously rotating the mechanism so as to present the molding units successively to a charging device or mechanism.

An object is to provide automatically operable means for successively opening and closing the molds and for discharging the molded articles therefrom.

A particular object of my invention is to provide improved means for molding perforations, recesses, indentures, or the like in articles such as door knobs and other fixtures, together with means for readily separating the waste material from the molded articles.

In certain types of molding machines, for the purpose of which my improvements may be used, the plastic material is usually fed from a stationary furnace or container and the operation of my machine, as hereinbefore stated, being continuous I have provided means for adjustably moving the discharge funnel of the furnace or receptacle relative to the successive molding units which are being rotated thereby during the operation of the machine for the purpose of effectively feeding charges of the plastic material to the molds in regular succession.

A further object of invention is to provide means associated with the molding units for effectively feeding the successive charges of plastic material into the bodies of the molds preparatory to the ensuing molding operations.

In general it is an object of this invention to synchronize the operation of the several units and contributing mechanisms of my machine for continuous operation thruout extended periods of time so that attention required to the operating parts is minimized and the molding operations are accomplished as automatically as possible and with a minimum amount of manual attention.

In the consideration of my invention other objects will appear as the description thereof progresses. In the accompanying drawings I have shown a form of mechanism for the purpose hereinabove mentioned, subject however, to modification within the scope of the appended claims without departing from the spirit thereof. In said drawings:

Fig. 20 is a sectional elevation of the molding unit especially arranged for perforating molded articles such as door knobs or the like.

My improved mechanism is generally arranged on an adjustable bed or truck A which may have wheels A1 arranged to move on a track A2 so that the machine may be bodily adjusted relative to a furnace for molten materials or a suitable container for other types of plastic materials, as at B. Positioned substantially above the bed A I provide a rotatable table A3 which is loosely mounted at its hub A4 on a post A5 stationarily held on the bed A. Substantially spaced above the table A3 but concentric therewith I provide a cam A6 which is stationarily held by suitable means on an extension A7 of the post A5. Near the top of the post A5 I provide a spider or second table A8 which is rotatably mounted on the upper end portion A9 of the post A5. The spider A8 and the table A3 are vertically connected at a suitable number of points externally of the periphery of the cam A6 by means of rods A10 which extend thru the spider and the table and receive screws A11 and A12 carried in the spider and in the table for the purpose of rigidly connecting said elements for simultaneous rotation about the axis of the post A5. (See Fig. 10.)

The table A3 has a depending peripheral flange A13 to which is attached a ring gear A14. Said gear meshes with and is driven by a pinion A15 carried on an extended shaft A16 from a gear reducing unit A17 which is suitably attached to the bed A, as shown in Fig. 28.

Figures 1, 2, 3:
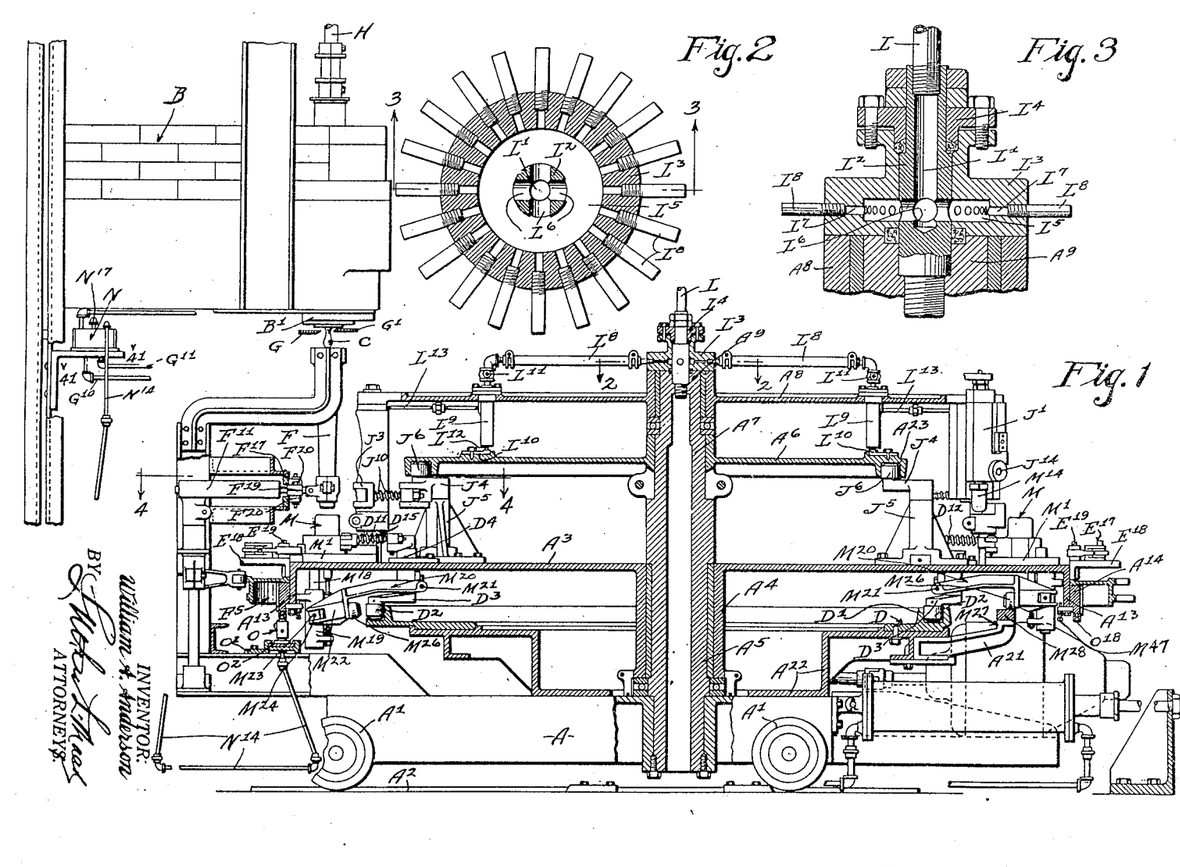
Fig. 1 is an elevation of an assembled molding mechanism partly in section and associated with a furnace or container for a plastic material capable of being molded in a machine.
Fig. 2 is a plan view of the air distributing head on line 2—2 of Fig. 1, from which compressed air from a source of supply is directed to the individual mold units for purposes hereinafter described.
Fig. 3 is an enlarged sectional elevation of the same on line 3—3 of Fig. 2.

Power is communicated to the gear reduction unit A17 from a motor A18 mounted on a suitable bracket A19 extended from the bed and connected with the reduction unit by means of a shaft A20. Thus, during the operation of the motor A18, the table A3, the spider A8 and the series of molding units carried on the table A3 are continuously rotated so that the molds on the table will be presented in regular succession to the material feeding means associated with the machine and with the furnace or container B, as seen in Fig. 1.

Figures 25, 26, 27, 28:
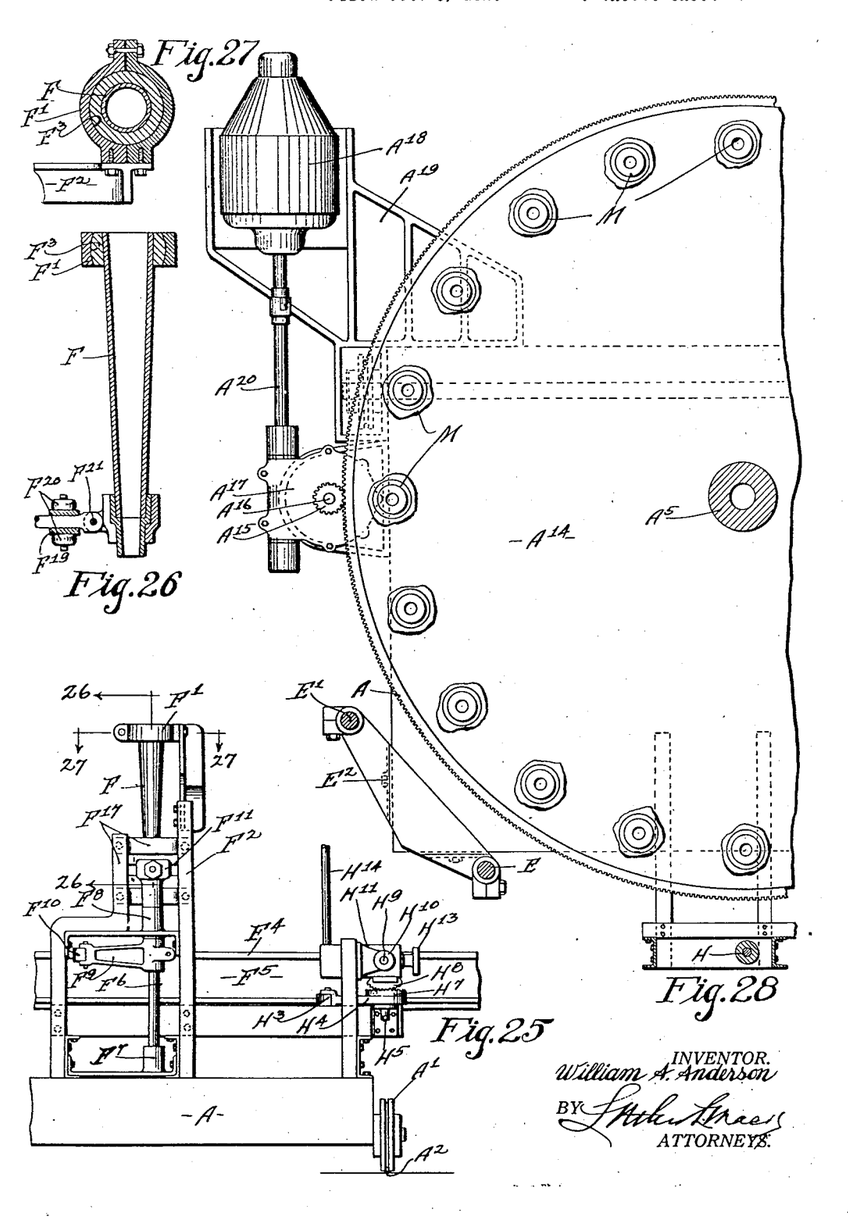
Fig. 25 is a side elevation of the material feeding mechanism shown in Fig. 4.
Fig. 26 is a sectional elevation of the material receiving funnel on line 26—26 of Fig. 25.
Fig. 27 is a sectional plan of the same on line 27—27 of Fig. 25.
Fig. 28 is a fragmentary plan view of the main driving mechanism of the complete molding machine.
Figures 29, 30:
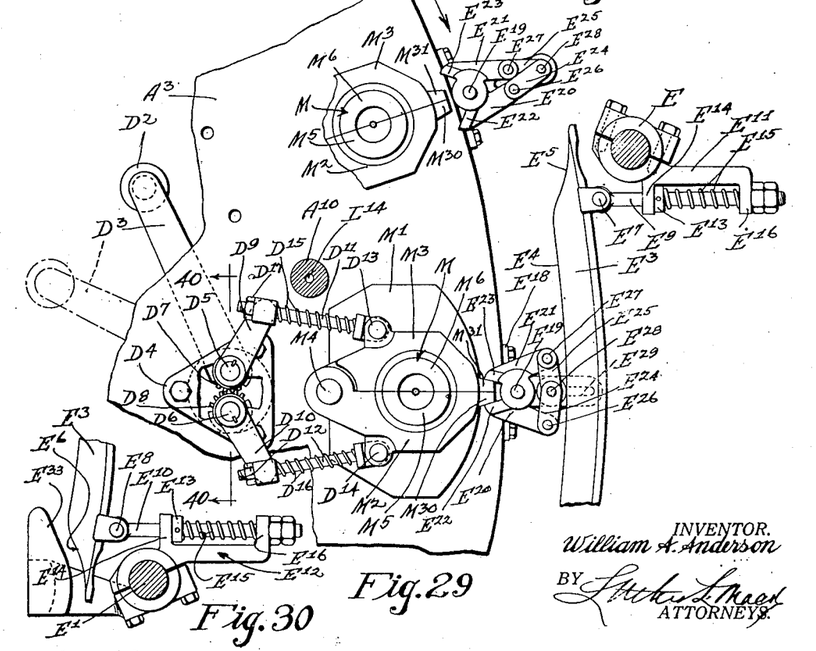
Fig. 29 is an enlarged plan view of one of the molds and associated mold closing and locking means.
Fig. 30 is a continuation of Fig. 29.

The molds M, M etc., are arranged on the upper face of the table A3 in a circle concentric with the axis of the post A5 and at regularly spaced intervals, as shown in Figs. 28 and 29. Each of the molds M comprises a plate M1 attached to the upper side of the table A3, a pair of relatively adjustable holders M2 and M3 pivotally supported on a common hinge pin M4, and a pair of halved molds M5 and M6 which are carried on and are suitably attached to the mold holders M2 and M3, respectively. (See Fig. 29.)

For certain articles, however, integral molds may be employed in lieu of the form of mold described. The halved mold is desirable for use in an automatic machine for quickly ejecting the molding articles in regular succession, especially where the molds are employed for the production of certain forms of molded articles such, for instance, as are shown herein.

Figures 9, 10, 11, 12, 13:
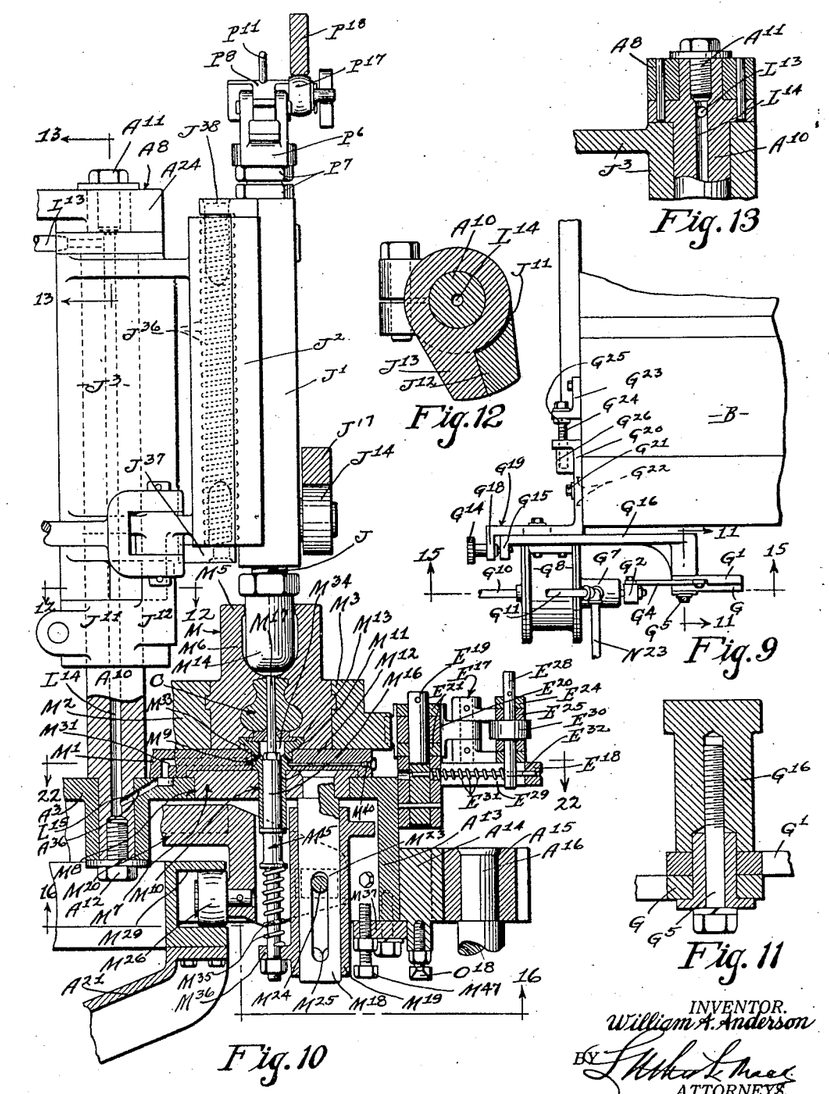
Fig. 9 is a fragmentary elevation showing means associated with the furnace or container for plastic material for shearing or cutting off the charges of material delivered to the molds.
Fig. 10 is an enlarged view partly in section of one of the molding units.
Fig. 11 is a sectional elevation on line 11—11 of Fig. 9.
Fig. 12 is a sectional plan on line 12—12 of Fig. 10.
Fig. 13 is a fragmentary section on line 13—13 of Fig. 10.

Each of the mold plates M1 carries a circular plate M7 on the bottom thereof with a flange adjacent the plate M1 and overlying a circular opening M8 in the table A3 thru which the body of the plate M7 extends, as shown in Fig. 10. The mold plates M1 and M7 are perforated at M9 and M10 respectively to receive portions M11 and M12 of guide sleeves which are positioned centrally of the mold members M5 and M6.

The upper extremities of the guide sleeves are provided with annular flanges M13 which fit corresponding recesses in the mold halves M5 and M6, as shown in Fig. 10, for the purpose of holding the molds against any upward thrust during the withdrawal of charging plungers M14 associated therewith.

The guide sleeves reciprocably support perforating plungers M15 which have enlarged internally threaded bodies M16 engaging the portions M12 of the sleeves and perforating pins M17 adjustably carried in said portions M16, as shown in Fig. 10.

Each of the molds M has a depending guide pin M18 which is riveted or stationarily affixed at its upper end to the mold plate M7. Said pin slidably receives a sleeve M19 which is carried on the outer end of an arm M20, one of said arms being provided for each of the mold units. The arms M20 are pivotally supported on and in positions beneath the table A3 on pins M21 and have bifurcated heads M22 between which blocks M23 are held so as to permit the lateral adjustment of the blocks between said furcations. The blocks M23 carry pins M24 which extend thru the sleeves M19 and are adapted to engage elongated slots M25 in the guide pins M18.

The arms M20 carry follower rollers M26 rearwardly of the heads M22 for engagement with a cam M27 which is in the form of a segment of a circle. The cam M27, as shown in Fig. 1, is stationarily held at a plurality of points on arms A21 which are integral with or are attached to a frame member A22 supported on the bed A. Said cam has a rise M28 formed thereon which, as shown in Fig. 1, elevates the arm M20, the sleeve M19 and the perforating plunger M16 sufficiently to completely perforate the body of plastic material C within the mold M at a given point in the rotation of the table A3.

At a succeeding point in the rotation of said table the cam is adapted to retract the pin M17 from the mold and to this end the cam is provided with a channeled portion M29, as shown in Fig. 10, for receiving the roller M26. The engagement of said roller with the portion M29 of the cam will thus serve to depress the plunger M15 and the sleeve M19 in the arm M20 so as to completely withdraw the pin M17 from the mold.

The molds are successively closed and opened for respectively receiving charges of plastic material and for ejecting the molded articles therefrom by means of a cam D which is preferably attached to the frame member A22 below the plane of the table A3. Said cam has a continuous channeled portion D1 encompassing the post A5 and adapted to receive the follower rollers D2 carried on arms D3, which are positioned below the table A3. The arms D3 are pivotally mounted on brackets D4 attached to the upper side of table A3 and said brackets carry a pair of vertical spaced pins D5 and D6 on one of which, as for instance D5, the arm D3 is mounted in each case. Said pins are connected for simultaneous rotation on the bracket D4 by means of sectors or pinions D7 and D8 respectively, as shown in Fig. 29. The upper ends of the pins D5 and D6 carry arms D9 and D10 respectively which are connected at their outer ends with the holders M2 and M3 of the molds M. Said connections include rods D11 and D12 which are pivoted at D13 and D14 respectively to the mold members M2 and M3 and carry springs D15 and D16 thereon intermediate the heads of the rods and are adapted to compress between said heads and the ends of the arms D9 and D10.

The outer ends of said rods carry nuts D17 whereby when the rollers D2 engage the cam D the arms D9 and D10 will move in opposite directions and will correspondingly move and spread the mold members M2 and M3 apart. The closing of the molds is accomplished by the same means but by the movement of the arms D3, D9 and D10 in a reverse direction against the tension of the springs D15 and D16.

Figures 17, 18, 19:
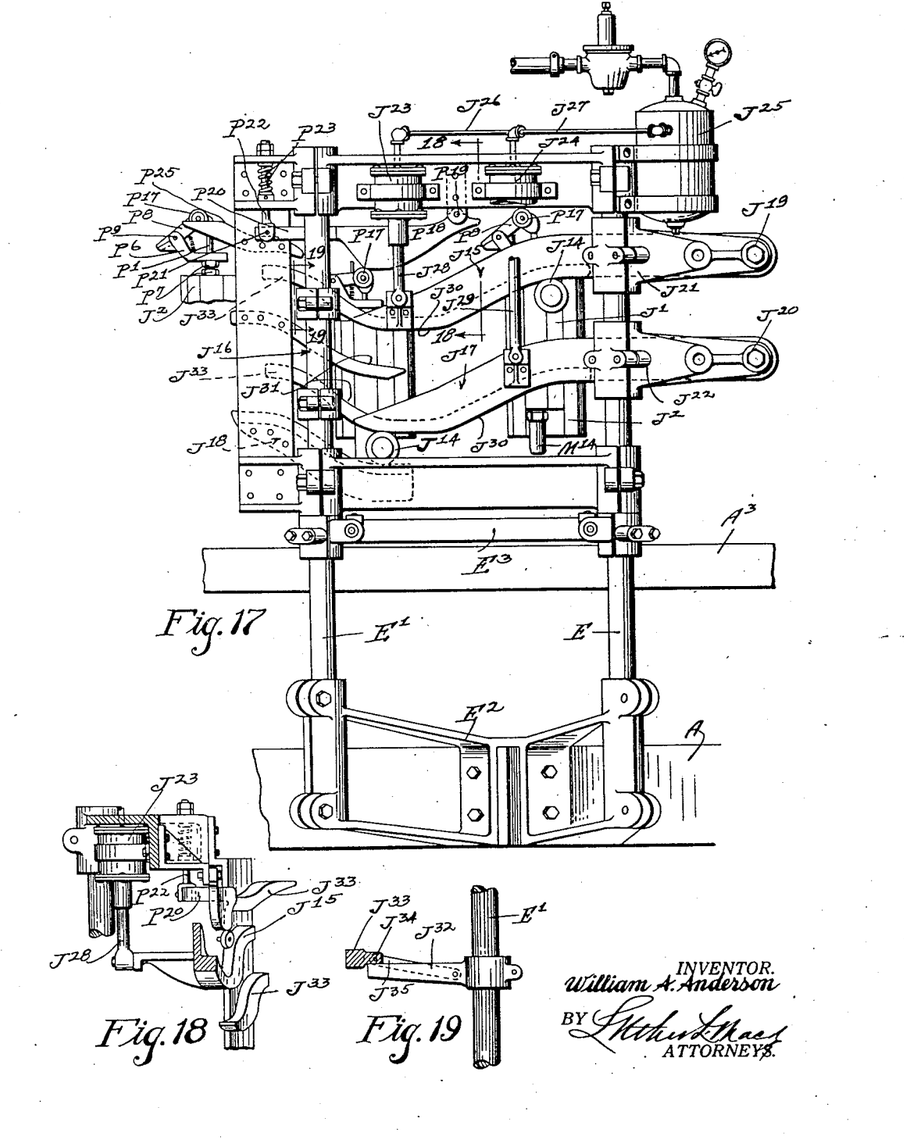
Fig. 17 is a fragmentary side elevation of the machine.
Fig. 18 is a fragmentary sectional elevation of the same on line 18—18 of Fig. 17.
Fig. 19 is a detailed fragmentary elevation on line 19—19 of Fig. 17.

The molds are locked in closed position by means of the mechanism shown in Figs. 17, 29 and 30. Said means includes a pair of spaced rods E and E1 which are carried in a bracket E2 attached to the periphery of the bed A. Just above the level of the table A3 I provide a yieldable cam E3 which is supported on the vertical rods E and E1. Said cam has an inner arcuate face E4 concentric with and spaced outwardly from the periphery of the table A3, and is provided with an approach E5 at one end of the cam face and a decline E6 at the other end thereof when the table A3 is adapted to rotate in a clockwise direction, as shown in Fig. 29. The extremities of the cam E3 are pivotally attached at points E7 and E8 to rods E9 and E10 which are slidably held in fixtures E11 and E12 respectively stationarily supported on rods E and E1.

The movement of the cam E3 in the direction of the table A3 is limited by means of set collars E13 fixed to the rods E9 and E10 adjacent portions E14 of the brackets E11 and E12. Said rods carry springs E15 which are compressible between the said collars E13 and outer portions E16 of the fixtures E11 and E12. Opposite each of the molds M and mounted on the flange A13 of table A3, I provide mold locking devices E17, each of which devices includes a bracket E18 attached to the periphery of the table. Said brackets carry vertically extended pins E19 on which pairs of mold locking members E20 and E21 are pivotally held and said members cooperate for locking the halves of the molds during a molding operation.

As shown in Fig. 29, the mold members M2 and M3 carry lugs M30 and M31 respectively while the adjacent ends of the members E20 and E21 are provided with jaws E22 and E23 respectively for engagement with the outer faces of the lugs M30 and M31. The outer ends of the members E20 and E21 are toggle connected by means of links E24 and E25 pivotally connected with the arms E20 and E21 at points E26 and E27 respectively and pivotally connected together at their inner ends by means of an elongated pin E28, the lower end of which slides in a slot E29 formed in the bracket E18. Said pin carries a follower roller E30 intermediate the links E24 and E25, the periphery of which is adapted to engage the face E4 of cam E3 as each molding unit approaches mold locking position and subsequent to the charging of the molds with material. The pin E28 is guided in a slot E29 so as to move the toggles in a radial plane relative to the axis of the post A5. Said pin is urged outwardly by a spring E31 carried on the pin E32 adapted to compress between the opposite terminals of the slot E29.

It will be observed by reference to Figs. 29 and 30 that as the table A3, when rotating in a clockwise direction, approaches the portion E5 of the cam E3, the roller E30 will engage the approach E5 and thus move onto the arcuate face E4 with which it will remain in contact during a molding operation for a suitable length of time.

Thereafter the roller descends from the face E4 downwardly over the decline E6, as shown in Fig. 30. Should the spring E31 prove insufficient to retract pin E28 and open the toggle lock I provide a short cam E33 having a face conforming in size to the portion E6 of cam E3 between which portions the upper end of pin E28 is adapted to move. Thus the cam E33 will positively open the toggle lock as the cam E33 is engaged and the cam E3 is disengaged.

Figures 14, 15, 16, 41, 42:
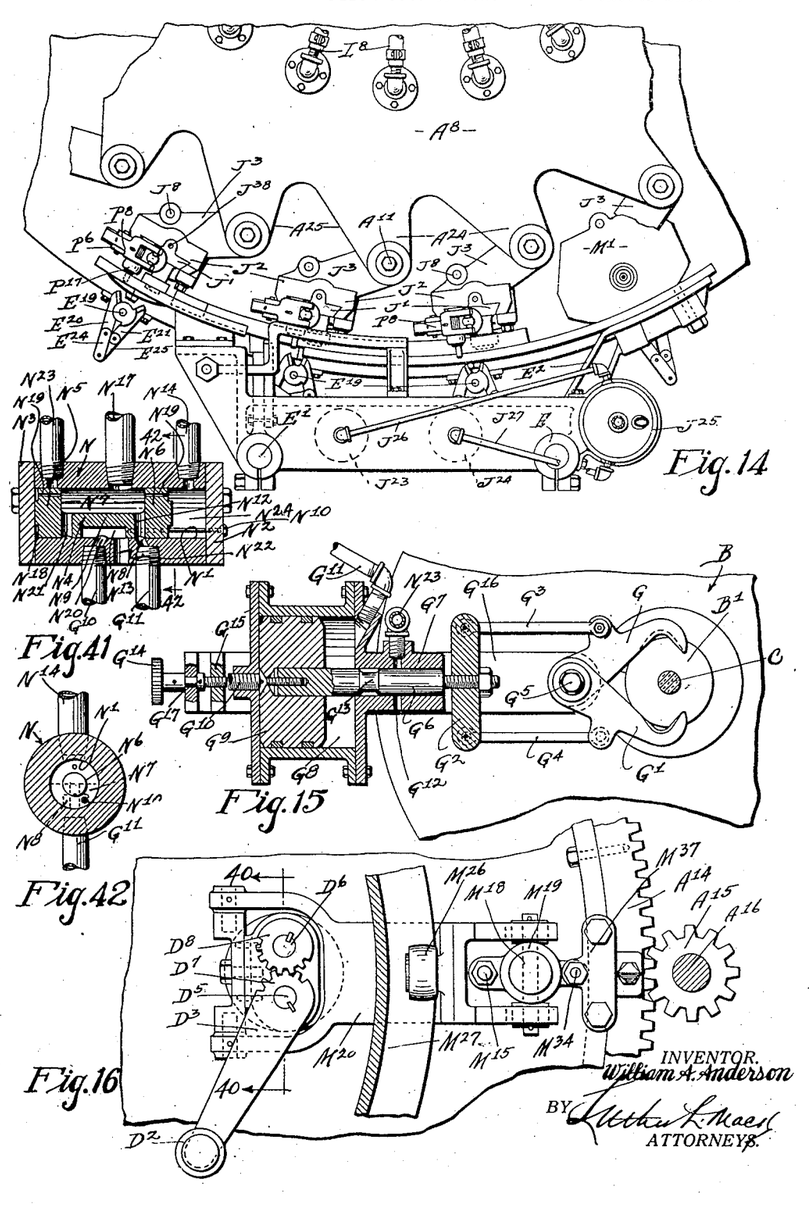
Fig. 14 is a fragmentary top plan view of the machine showing several of the molding units thereof.
Fig. 15 is a sectional plan of the cut off mechanism on line 15—15 of Fig. 9.
Fig. 16 is a bottom plan view of one of the molding units as seen on line 16—16 of Fig. 10.
Figs. 41 and 42 are, respectively, a longitudinal section on line 41—41 of Fig. 1, and a transverse section on line 42—42 of Fig. 41 showing details of a reversing valve.

The furnace or container B has a mouth B1 from which plastic material C is adapted to be discharged into a funnel F which is normally positioned over the opening in the molds M successively. The mouth B1 is normally closed against the passage of material therefrom by means of a closure device including a pair of shears G and G1 which are pivotally connected with a cross head G2 by means of rods G3 and G4 respectively, as shown in Fig. 15. The shears G and G1 are commonly pivoted on a bolt G5 and are arranged so that when the cross head G2 is reciprocated the shears will open and close relative to the mouth B1 of the furnace or receptacle B so as to permit the charging of the funnel F with predetermined quantities of material at regularly spaced times and synchronously with the movement of molds to and from charging position.

The cross head G2 is attached to an extended portion of the rod G6 which is slidable in a hub G7 of a compressed air cylinder G8 and has a piston G9 attached to its inner end. Air under pressure is admitted to opposite sides of piston G9 into the cylinder G8 by means of inlet pipes G10 and G11.

A suitable reversing mechanism for association with cylinder G8 for the purpose of opening and closing the shears G and G1 is shown in Fig. 41, and will be described hereinafter in detail.

The upper end of funnel F is oscillatably supported in a fixture F1 secured to a suitable frame F2 extended upwardly from and mounted on the base A. Preferably the funnel has a spherically formed head F3 and the member F1 is provided with a correspondingly formed seat whereby the upper end of the funnel may be fixed in its position beneath the mouth B1 of the furnace or container while the lower end of the funnel is oscillatable by means hereinafter described.

The rotation of the molds M continuously necessitates the provision of means for continuing the registration of the funnel F with the successive molds for short periods of time in order that the funnel may be completely evacuated of its charge of material at each operation, and that said charge of material may be completely transferred to the mold cavity.

Figures 4, 5, 6, 7, 8:
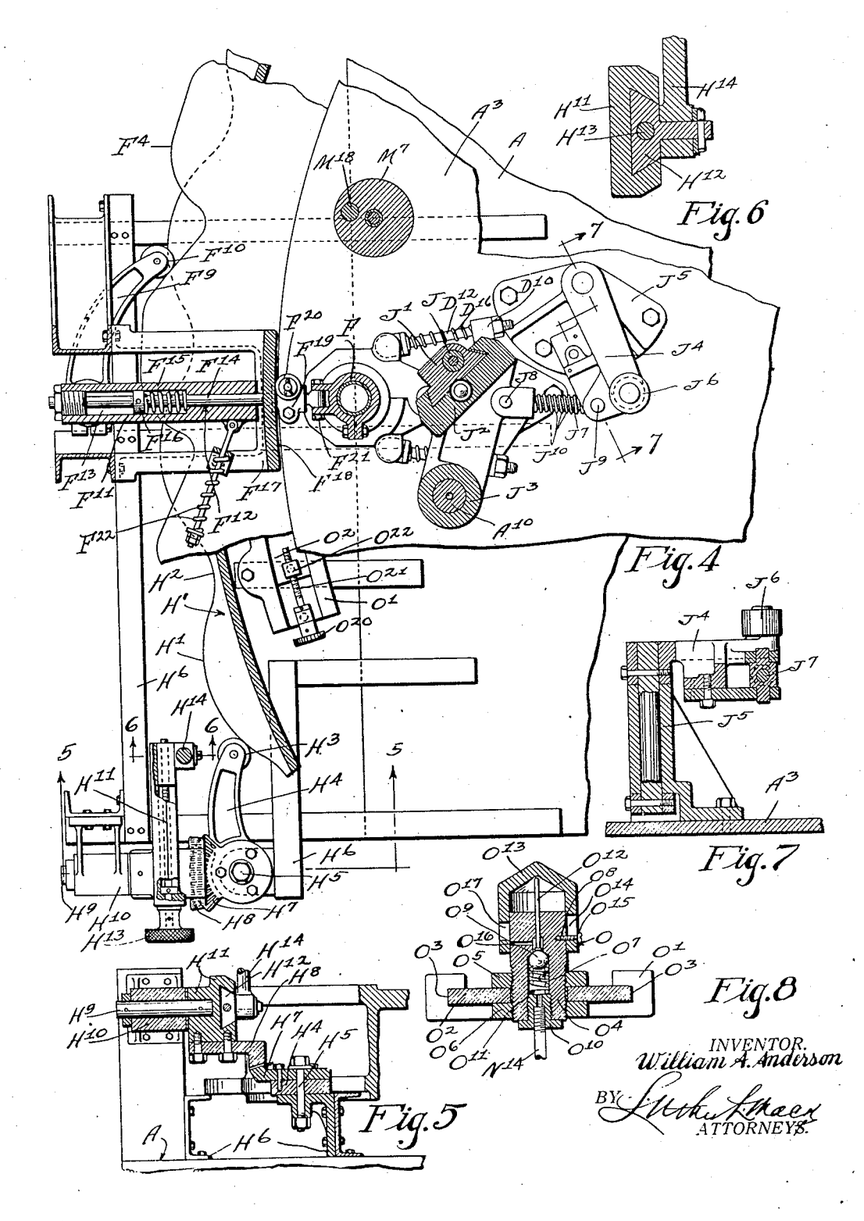
Fig. 4 is an enlarged fragmentary sectional plan of the machine on line 4—4 of Fig. 1 showing one of the molding units and the feeding mechanism by means of which the molds are charged with plastic material from a source of supply.
Fig. 5 is a sectional elevation of the mold feeding mechanism on line 5—5 of Fig. 4.
Fig. 6 is a detailed section of the same on line 6—6 of Fig. 4.
Fig. 7 is a sectional elevation on line 7—7 of Fig. 4 showing details of the pressing head mechanism of one of the mold units.
Fig. 8 is a sectional elevation of an air bleeder valve associated with other devices for the purpose of cutting off the charges of material delivered to the molds.

The travel of the lower end of the funnel with each successive mold is accomplished by means of a cam F4 which has a plurality of facets corresponding in number to the number of molds on the table A3. Said cam has its cam surfaces formed on a member F5 attached to the flange of the table A3, as shown in Fig. 1. The frame F2 oscillatably supports a vertical shaft F6 in bearings F7 and F8 and to said shaft a follower arm F9 is suitably fixed and is provided with a follower roller F10 adapted to engage the cam surfaces F4. The follower arm F9 is resiliently held in engagement with its cam F4 by means of a spring F22 which may be arranged as shown in Fig. 4 or otherwise.

Fixed to the upper end of shaft F6 I provide a sleeve F11 which has a bore F12 and a counter-bore F13 adapted to receive a plunger F14 which carries a compression spring F15 within the counter-bore F13 acting against a set collar F16. Attached to the frame F2 is a stationary cam F17 which has an arcuate surface F18 concentric with the axis of the post A5, said surface being inwardly of the end of sleeve F11, as shown in Figs. 1 and 4. The inner end of rod F14 is provided with a fixture F19 which is clamped to the rod and rotatably carries a pair of cam rollers F20 adapted for engagement with the cam surface F18.

The tension of the spring F15 serves to position the rollers F20 against the cam surface. The funnel F is connected at F21 with the inner end of rod F14 in such a manner that the operation of the follower arm F9 about the axis of the shaft F6 will tend to swing the funnel F also in a path concentric therewith. The reversely curved cam surface 18, however, being concentric with the axis of the table A3 and the funnel F being yieldable relative to the sleeve F11, the funnel is constrained by the movement of the rollers F20 over the surface F18 to follow a path concentric with the axis of the table.

It is quite obvious that it is necessary to provide means for moving the charging plunger M14 and the funnel F from registration with the mold cavity. The operation of the charging mechanism requires that the funnel F be first positioned over the mold cavity and thereafter removed from such position while the charging plunger M14 is moved into registration with the mold cavity for insuring the proper charge of material at each operation. Thus, at the beginning of a charging operation the shears G and G1 are first operated for charging the funnel F and immediately following this the funnel F is oscillated at its lower extremity and is moved with and at substantially the same speed as the mold is moved by the charging point thru the medium of the cam F4 and follower F9. When the follower F9 has traversed the full length of the cam facets F4 the intermediate declining facets are traversed, which effects the restoration of the funnel into charging position for a succeeding mold. This action is repeated for each of the molds in succession. The follower F9 may be suitably held by spring tension in contact with the cam F4.

The material is fed from the container B thru the funnel F by means of a plunger H which is operatively connected with means shown in Figs. 4, 5 and 6 in a manner not material to my invention. Said means, however, includes a cam H' having a plurality of alternating high and low facets H1 and H2 which may be formed as shown on the member F5. Said cam is engaged by a follower roller H3 carried on an arm H4 which is pivotally mounted on a shaft H5, as shown in Figs. 5 and 6. Said shaft H5 is suitably supported on a sub-frame composed of members H6, H6 attached to the base or bed A of the machine.

Associated with the arm H4 is a beveled gear H7 which meshes with a sector H8 carried on the shaft H9 which is held in the bearing H10 on the sub-frame. The gear H8 is connected with the plunger H on the container B by means of an adjustment device including a guide H11 formed on or attached to the gear H8 and a tongue H12 which is slidable in the guide by means of an adjustment screw H13 connected therewith. The tongue H12 may be connected by means of a rod H14 and other suitable devices, with the plunger H.

It will be obvious that the adjustment of the rod H14 in the direction of or away from the axis of shaft H9 will vary the stroke of the rod H14 and plunger H with which it is connected, thus regulating the amount of material employed in a charging operation.

The charging plunger M14 is carried on a rod J within a slide J1 which is reciprocably mounted on a guide J2. Said guide is pivotally mounted at its hub J3 on one of the rods A10 which connects the table A3 with a spider A8, as shown in Figs. 4 and 10.

Referring particularly to Fig. 4, the plunger M14 is adapted to swing to the left about its axis into position over and in registration with the mold cavity subsequent to the completion of a charging operation and the retraction of the funnel F from such position. The oscillation of the member M14 is accomplished by means of the cam A6 in connection with a follower arm J4. The arm J4 is pivotally mounted on a bracket J5 attached to the table A3 and carries a roller J6 which engages the channel portion A23 of cam A6. The member J3 is connected with the follower J4 by means of a link J7 which is pivoted to said members at J8 and J9 respectively, as shown in Fig. 4.

The rod J7 carries a compression spring J10 and is loosely connected with the member J3 so that said spring may be effective for cushioning the operation of the mechanism when its proper position in registration with the mold cavity is reached. The rod A10 carries a set collar J11 thereon with a lug J12, which is adapted to engage a lug J13 on the member J3 as shown in Fig. 12, for limiting the action of the member J3 and plunger M14.

It is desirable to arrange the charging plungers M14 so that the several plungers may be differentially operable or the length of the stroke varies to meet conditions obtaining in the different molds M with which they are associated. To this end I provide a roller J14 on the outer face of each of the slides J1, but said rollers are positioned alternately near the upper and lower extremities of the slides J1, as shown in Fig. 17; i. e., to say that the rollers on alternate slides will be at the bottom of the slides, while the rollers on the remaining slides will be at the tops thereof.

Accordingly I provide two separate sets of cams J15 and J16, and J17 and J18, for engagement with the differently positioned rollers J14, as shown in Fig. 17. The cams J15 and J17 are yieldably mounted at points J19 and J20 respectively on brackets J21 and J22, said brackets being supported on the rod E, as seen in Fig. 17. The cams J15 and J17 have compressed air cylinders J23 and J24 associated therewith which are supplied with compressed air from a tank J25, also mounted on rod E and connected with said cylinders by means of pipes J26 and J27, respectively. The pistons, not shown, within the cylinders J23 and J24 are operatively connected with cams J15 and J17 by means of rods J28 and J29. Thus the cams J15 and J17 are yieldable against air pressure within the cylinders J23 and J24. Said cams have cam faces J30 adapted to be engaged by the rollers J14 on the slides J1 for the purpose of depressing the plungers M14 into the molds during a charging operation.

The cams J16 and J18 associated with the cams J15 and J17 are provided with cam faces J31 which are turned upwardly as shown, and are adapted to be engaged by the rollers J14 for moving the slides J1 and the plungers M14 upwardly at the completion of a charging operation.

The cams J16 and J18 are suitably mounted on the rod E1. The movement of the cams J15 and J17 downwardly is limited by means of brackets J32 supported on rod E1, which extends inwardly beneath extensions J33 of the cams J15 and J17. (See Figs. 17 and 19.) The cam extensions J33 have lugs J34 formed thereon which bear against the upper surfaces of the brackets J32. The extensions J33 are movably connected to the arms J32 by means of links J35 to provide against distortion of the cams when pressure is exerted thereon by the rollers J14. It will be noted that the spider A8 is provided with peripheral tooth-like projections A24, A24 etc., on which the hinge rods A10 for the charging plungers J are pivotally held by means of the screws or bolts A11. The notches A25 alternating with the extensions A24 provide recesses within which the units J may be retracted when said units are inoperative. Thus the charging units J are pivotally mounted on the revolving table A8 and of course revolve continuously with said table during the operation of the mechanism.

Referring now to Figs. 1, 2, 3 and 10 particularly, I have illustrated a means for supplying air under pressure to the molds M subsequent to the molding operations, for the purpose of cooling the interior of the molded articles to prevent collapsing or distortion of the articles cast in the mold. Such means also serves to cool the ends of the perforating pins where perforating molds are employed, as shown in Figs. 31 to 40 inclusive.

The said air supply means includes a main air line L leading from a suitable source of supply thru a passage L1 in a sleeve L2 which is carried in a distributing head L3 mounted on the top of the central post A5 of the machine. Said sleeve is packed with a suitable gland L4 attached to the head L3, and said head has an annular chamber L5 therein which communicates with the passage L1 by means of a plurality of outlet ports L6 formed in the member L1.

The distributing head L3 has a plurality of radially arranged outlets L7 which communicate with distributing pipes L8, L8 etc., leading to bleeder valves L9 supported on the spider A8 and adapted to be operated at regularly timed intervals for admitting air to the molds M by means of a suitable cam L10 mounted on the upper side of the cam A6. The several distributing pipes L8 may be provided with shut-off valves L11 at points adjacent their connection with the bleeder valves L9. The head L3, pipes L8, and valves L9 all rotate with the spider A8. The bleeder valves L9 may be provided with stems L12 adapted to engage facets of the cam L10 for opening said valves so as to direct the supply of compressed air from the valves and thru branch pipes L13 to the interior of the posts A10 on which the charging units J are mounted.

Said posts are provided with bores L14 extending therethru which are closed at their opposite ends by means of the screws A11 and A12. The passages L14 communicate with passages M31 in the mold plates M1 by means of diagonal passages L15 and A36 which are formed respectively in the posts A10 and the table A3. The mold plates M1 are provided with central annular passages M32, while the sleeves M12 of the molds are provided with diagonal ports M33 which afford communication between the annular passages M32 and the central chamber M34 of said sleeves. Thus the air is conducted from a source of supply at proper times and at regular intervals to the interior of the mold cavity for use in cooling the perforating pins M17 and the perforations in the molded articles, as described.

A suitable reversing valve mechanism is shown in Figs. 41 and 42 for alternately opening and closing shears shown in Fig. 15. The reversing valve includes a cylindrical body N with a longitudinal bore N1 formed therein and closed at its ends by means of heads N2 and N3 attached to the body N. A piston valve N4 is slidably mounted in bore N1 and is provided with circular end portions N5 and N6 fitting the bore N1 and recesses N7 and N8 formed between the portions N5 and N6 on opposite sides of a web N9. The valve N4 is held against rotary movement in the bore N1 by means of a pin N10 which may be fixed to one of the heads, as at N2, and arranged for the valve to slide thereon.

Normally the arrangement of the reversing valve is as shown in Fig. 41 when the shears G and G1 are open, as shown in Fig. 15, so that air pressure from a source of supply may be directed thru a pipe N17 thru the recess N7 of the valve and thence thru a port N12 in the valve and another port N13 of the valve body, into the pipe G11 and thence to cylinder G8 associated with the shears. The air pressure in such case normally holds the piston G9 in cylinder G8 in retracted position, as shown in Fig. 15, and the shears G and G1 open. The chamber N24 of valve N communicates thru a pipe N14 with a bleeder valve O, as shown in Fig. 8. The bleeder valve O is mounted in fixed position on the bed A by means of a bracket O1 which is attached to the bed at a point below the charging position of the table.

The valve is adjustably mounted on the bracket O1 by means of a disc O2, the periphery of which is held in channels O3, O3 of the bracket O1, and the valve body O4 is clamped to said disc by means of nuts O5 and O6 engaging opposite sides of the disc. The adjustment of the valve is accomplished by means of an adjusting screw O20 which is mounted on the supporting member O1 and has a stem O21 which has threaded engagement with a lug O22 on the disc O2. The valve body O4 is provided with a longitudinal bore O7 and a conical seat O8 at its upper end for seating a ball valve O9. The lower end of the bore O9 is closed by means of a plug O10 between which and the ball valve O9 a spring O11 is held in compression.

The pipe N14 leading from the reversing valve N is connected with the plug O10 of the bleeder valve so as to afford communication between the chamber N13 of the reversing valve with the chamber O7 of the bleeder valve. The valve O9 carries an upwardly extending plunger O12 which is slidable in the upper portion of the body O4, and its upper end is adapted to engage the inner side of a conical head O13 which is slidably mounted on the body O4. The head O13 has one or more slots O14 on the periphery thereof thru which screws O15 are extended from the body O4 so as to guide the head in its vertical movement on the body. The body O4 has an exhaust port O16 which is normally closed by the lower portion of the head O13 and is adapted to be open to the atmosphere when the head is depressed on the body by reason of the registration therewith of an aperture O17 on the periphery of the head. Thus when the head is depressed against the tension of spring O11 and the valve O9 is open, pressure from the chamber N13 of the reversing valve is relieved thru the pipe N14, the valve chamber O7 of the bleeder valve, the valve seat O8, and the ports O16 and O17. The tension of spring O11 serves normally to support the head in its uppermost position on the body so that the port O16 will be normally closed to the atmosphere.

The purpose of the bleeder valve shown in Fig. 8 is to relieve the chamber N13 of the reversing valve of pressure so as to permit the movement of the piston N4 to the right, as seen in Fig. 41. The bleeder valve is operated at the same point in the rotation of each of the mold units by means of pins or extensions O18 which depend from the gears A14 or other suitable portions of the table A3 in the operation of the mechanism, each of the mold units being provided with one of such devices. The pins or projections O18 engage the conical head O13 and serve to depress the head on the body of the bleeder valve.

Subsequent to the bleeding of the pressure from the chamber N24 the air pressure from pipe N17 which is present in the chamber N7 and also in a shallow chamber N18 at the left of the portion N5 of the piston, due to the presence of a restricted port N19 in the portion N5, moves valve N4 rapidly to the right, thus serving to close the port N13 and to open an exhaust port N20 in the valve body N to which the pipe G10 from the cylinder G8 is connected. Thus air under pressure is directed from the chamber N7 thru a port N21 in the piston and thence thru port N20 and pipe G10 to the left hand side of the piston G9 in cylinder G8.

The movement of piston G9 to the right, as seen in Fig. 15, exhausts the air from said cylinder thru pipe G11, port N13, recess N8 of the valve N, and a port N22, to atmosphere. Thus the pressure from the air supply pipe N17 moves piston G9 to the right in cylinder G8 and simultaneously closes the shears G and G1 for cutting off a charge of material C delivered to the mold.

A reverse movement of the valve N4, i. e., to the left, as seen in Fig. 41, exhausts the air from chamber N18 to a pipe N23 which is connected with a diametrical passage G12 in the hub G7 of cylinder G8. Such exhaust is possible, however, only when the piston G9 is positioned at the right hand limit of its stroke so that the opposite portions of the exhaust passage G12 will be in communication thru the medium of an annular chamber G13 in the piston stem. In Fig. 15 said annular chamber is shown in a position which closes the opposite portions of passage G12 against communication. One of the ports N19 may be provided in a portion N6 of the piston N4, as shown, for bleeding the chamber N13 of any slight remaining pressure therein when the valve N4 moved to the right or into position for closing the shears. The port N19 in the portion N6 of the piston valve is necessary to build up pressure in the chamber N13 from the chamber N7 for balancing the valve in operation and for the purpose of holding the valve at its extreme left hand position or in position for holding the shears normally open.

When, however, the valve N4 is moved to the right, or into position for closing the shears, the chamber N13 is open to the atmosphere so as to permit the building up of pressure in the chamber N18 to move the valve into shear closing position.

As shown in Fig. 9, the shears G and G1 and associated operating mechanism are supported on the furnace or container B in such a manner that the mechanism may be adjusted longitudinally and vertically with respect to the mouth of a furnace or container. Such means may include an adjustment screw G14 threaded into the portion G15 of a supporting bracket G16 and provided with a set collar G17 adjacent a flange G18 depending from the bracket G19 on which the mechanism is mounted. It is obvious that the rotation of screw G14 will adjust the bracket G16, the cylinder G8 and shears G and G1 longitudinally on the bracket G19. The bracket G19 is provided with a vertical arm G20 slidably supported on the member B by means of one or more screws G21 extending thru slots G22 permitting the vertical movement of the mechanism bodily on the member B.

A fixed bracket G23 is provided on the member B which carries an adjusting screw G24 rotatably mounted therein and held by means of a set collar G25. Said screw is threaded into a boss G26 of the bracket G19 so that as the screw is rotated the bracket G19, the bracket G16, the cylinder G8 and shears G and G1 will be adjusted as a unit on the member B.

As shown in Figs. 31 to 39 inclusive I am enabled to perforate wholly or partly thru, or to indent the molded articles, as may be desired, and to insert metal bushings or the like in the material during the molding operations. For instance, in Figs. 31 and 32 I have shown means for providing perforations which extend entirely thru the molded articles, such as door knobs, thru which perforations attaching bolts may be extended, and I have also provided therein means for indenting the outer ends of the knobs for receiving the heads of the bolts or screws.

Figure 31:
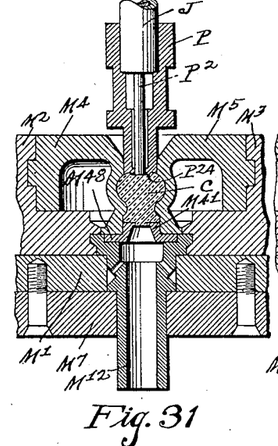
Figs. 31 and 32 are, respectively, typical sectional elevations of the mold showing two consecutive stages in the operation of the mold for producing a perforated casting of an article.
Figures 32, 33, 34:
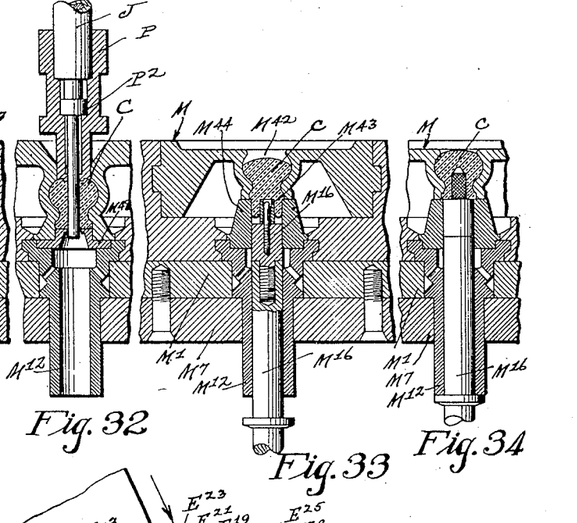
Figs. 33 and 34 are similar sections of a mold showing successive stages in the operation of the mold for production of a different form of article.
Figure 35:
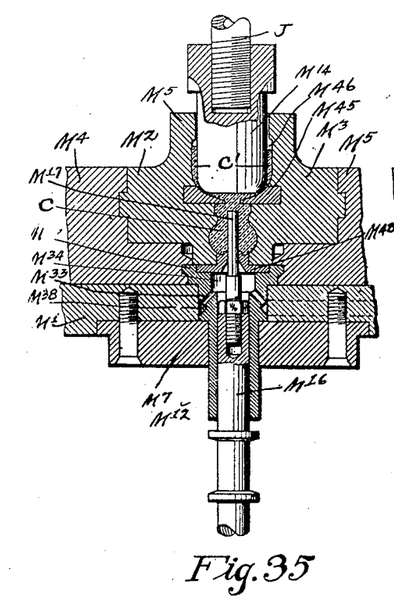
Figs. 35, 36 and 37 are typical sections of a mold showing successive stages of operation of the mold for the production of a given form of article therein.
Figure 36:
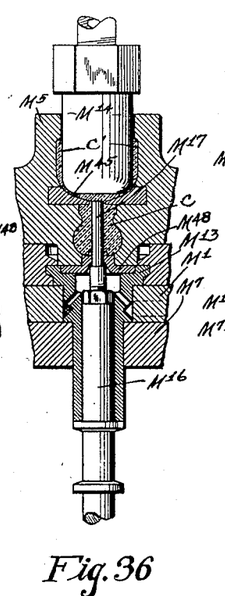
Figure 37:
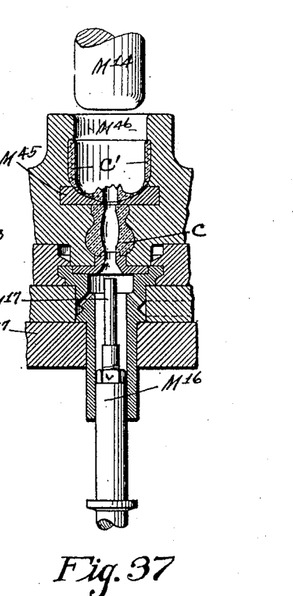

In Figs. 33 and 34 I have shown means for casting metal bushings in the molded articles for receiving attaching screws and the like. In Figs. 35 to 37 inclusive I have shown means for perforating articles from beneath the molds, as distinguished from the mechanism shown in Figs. 31 to 34 inclusive wherein the perforations are made from above the molds.

Figures 38, 39:
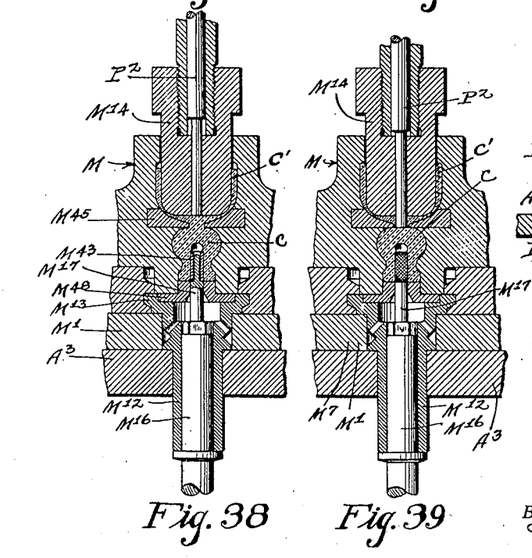
Figs. 38 and 39 are typical sections of a mold showing different stages in the production of an article differing slightly from the article produced in Figs. 35, 36 and 37.
Figure 40:
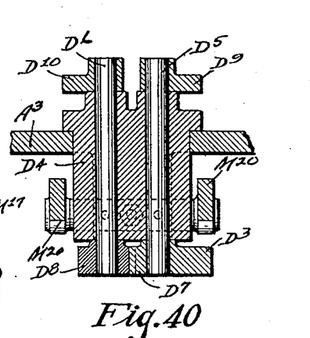
Fig. 40 is a detailed sectional elevation of the mold closing means as seen on line 40—40 of Fig. 29.

In Figs. 38 and 39 I have shown means associated with the charging plunger for cutting off the waste material from the molded articles at the tops of the articles at the completion of a molding operation.

In all of these several methods I employ the mechanism shown in Figs. 4, 10, 17, 20 and 21. The perforating mechanism is preferably mounted on the charging head in association with or apart from the charging plunger M14.

Figure 20:
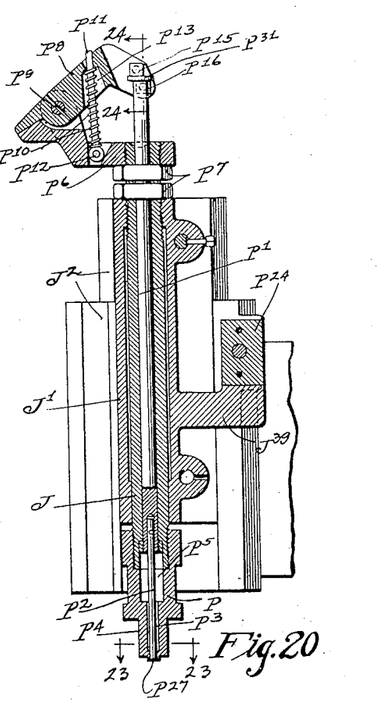
Figure 21:
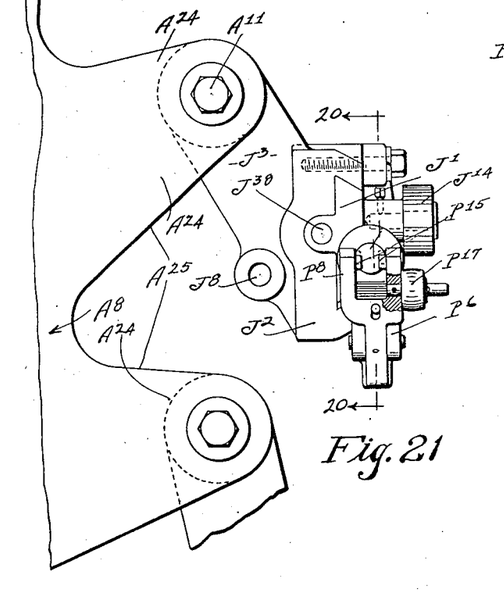
Fig. 21 is a top plan view of the mechanism shown in Fig. 20.

Referring first to the mechanism for carrying out the operations shown in Figs. 31 and 32, and with particular reference to Figs. 20 and 21, it will be noted that I remove the charging head M14 which is shown in Fig. 10 from the plunger J and attach to the lower end of the plunger J in lieu thereof a substitute head P, the upper end of which is threaded onto the lower end of plunger J. Internally of the plunger J I provide a slidable rod P1 which has a perforating pin P2 removably attached to the lower end thereof and extended thru the bore P3 in the lower portion P4 of the head P. Said head is provided with a chamber P5 permitting the reciprocation of the rod P1 in the head and serving to limit the stroke of the rod in the head when moved in opposite directions.

Figures 22, 23, 24:
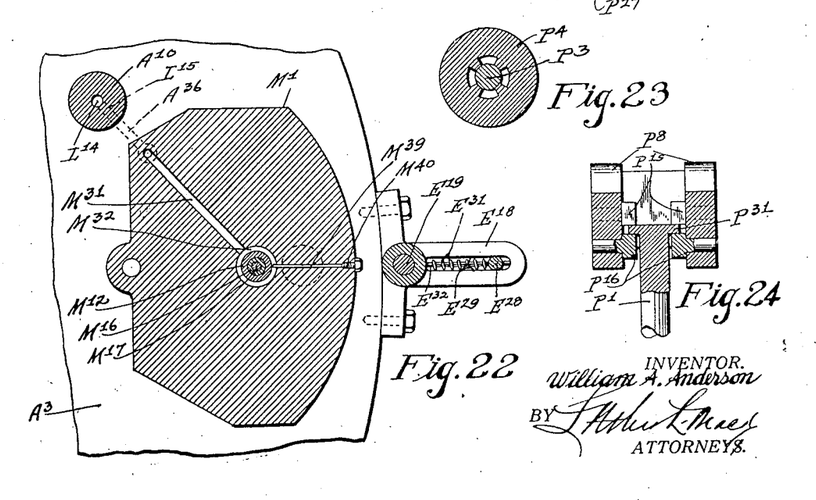
Fig. 22 is an enlarged plan view of a mold base typical of all the molding units, showing the air distribution system associated therewith.
Fig. 23 is a sectional plan on line 23—23 and Fig. 24 is a sectional elevation on line 24—24 of Fig. 20.

The plunger J is screwed into the upper end of and is adapted to move with the slide J1, the extreme upper end of the plunger being threaded into a bracket P6 which is adjustable relative to the slide by means of lock nuts P7. The bracket P6 pivotally supports a follower arm P8 on a pin or bolt P9 which is urged upwardly by means of a compression spring P10 carried on a pin P11 which is pivotally held on a pin P12 at its lower end attached to the bracket P6. The upper end of spring P10 seats in a recess P13 in the arm so that the spring will compress between the bracket and the arm. The rod P1 extends upwardly thru the bracket P6 and is connected with the outer end P14 of arm P8. Said connection includes a flat head P31 on the rod P1 which slidably engages adjacent portions of two pairs of pivoted blocks P15 and P16 which are carried on the follower arm, as shown in Fig. 24.

Thus the movement of the arm will effect a corresponding reciprocation of the rod P1 relative to the head P. Arm P8 carries a roller P17 which at a predetermined point in the rotation of the table A3 engages a cam P18 which is pivotally supported on a cross member of the frame, as shown in Fig. 17, by means of a pin P19. Said cam has an extension P20 which is pivotally connected at P21 to a spring held bolt P22 slidably supported on the frame and tensioned by means of a compression spring P23.

Thus as the table is revolved and the mechanism shown in Figs. 20 and 21 is moved to the left, as shown in Fig. 17, the roller P17 of each molding unit will successively engage the lower edge of the cam P18, thus serving to depress the rod P1 until the completion of a perforating operation, after which the roller will quickly disengage the cam and permit the rapid restoration of the rod and the slide J1. The slide J1 is provided with a lug J39 which engages the lug P24 on the slide mounting J2 which limits the upward movement of the slide.

At one side of the slide J1 I provide a compression spring J36 which compresses between a plate J37 on the bottom of the member J2 and a lug J38 on the top of the slide J1 for normally urging the slide together with the plunger J and its head P upwardly against a stop P24. It is understood that as the head P descends the rod P1 and pin P2 descend simultaneously therewith to the position shown in Fig. 31, after which cam roller P17 engages cam P18 depressing rod P1 and pin P2, perforating the plastic material in the mold cavity, as shown in Fig. 32.

Roller P17 and follower arm P8 are then lifted by spring P10 into upper position, pulling rod P1 and pin P2 upward to position shown in Figs. 20 and 31. An auxiliary cam P25 is provided on member E1 for assisting spring P10 in raising rod P1 and pin P2 in the event pin P2 should adhere to the plastic material and resist the tension of spring P10 while the articles are being perforated.

The mold sleeve M12 has an annular groove M38 formed therein into which projects an extended portion M39 of a set screw M40, which is carried in the mold plate M1. Said screw serves to prevent the vertical movement of the sleeve relative to the mold.

Plunger M15 carries a compression spring M35 on its lower end and above a lug M36 on sleeve M19, which cushions the plunger against impact in the presence of an obstruction in or above the mold. An adjustment screw M47 is held on a bracket M37 attached to the rim A13 of table A3 and serves to adjust and limit the downward movement of sleeve M19.

In operation, the material is fed thru the mouth of the container B as shown in Fig. 1, and the depending mass of material C is severed by the shears G and G1, whereupon the material will drop into the funnel F and thence into the mold M as a mold passes beneath the funnel. The material is thus fed in measured quantities to each of the molds in succession.

When the material has been dropped into the mold the roller J14 on head J1 is engaged by cam J17 which serves to depress the head with the plunger P, thus forming the molded article in the mold M. Prior, however, to the above described operation, the locking cam E5 has engaged roller E30 for compressing the arms E24 and E25 and closing the mold jaws E26 and E27 over the lugs M30 and M31 respectively for securely locking the mold parts together.

Subsequent to the descent of the head P into the mold and the completion of the pressing operation, the roller J14 engages cam J18 and lifts slide J1 and head P out of the mold to its uppermost position, as shown in Fig. 20. Thereafter the mold is unlocked by the engagement of roller P30 with the portion E6 of cam E3, whereupon roller D2 on arm D3 is then retracted by its engagement with cam D1. Arms D9 and D10 and links D11 and D12 are thus pulled backwardly and the mold M is opened sufficiently for the removal of the molded articles. When the mold is opened the cam roller J6 has engaged cam A23 and has retracted arm J4, thereby pulling back the head J2 and slide J1 to normal position, the mold M being then free to receive a new charge of material.

On the top of sleeve M12 I provide a plate M48 which may have a central aperture formed in a reduced extension M41, as shown in Fig. 31, so that as the material C is dropped into the mold M it will rest upon the portion M41 of plate M40. Following the deposit of the mass of material C the head P and perforating pin P2 are lowered, as hereinbefore described, for closing the upper side of the mold.

The pin P2 is extended thru the mass of material C for forming a central perforation therein, and the size of the aperture in the portion M41 of the mold substantially corresponds to the size of the pin.

The lower end of head P may be provided with a shallow central extension P27 which provides a corresponding indenture in the upper end of the molded article C for receiving a screw head, while the screw body may be extended thru the central perforation formed by the pin P2.

Fig. 31 shows the beginning of a perforating operation while Fig. 32 shows the completion of such an operation. Figs. 33 and 34 show the molds M adapted for molding articles requiring no central perforations therein. As shown in Fig. 33, the material C is discharged into the mold cavity M42 above the upper end of the plunger M16 on which may be loosely held a sleeve or bushing M43 adapted to be cast in the article C. When the mold is charged with material the upper end of plunger M16 is positioned below the upper end of a mold fixture M44 substituted for plate M48 so that the material will flow downwardly into the plunger seat around the sleeve M43. Subsequently the plunger M16 is moved upwardly by the means shown in Fig. 10 and serves to force the sleeve M43 into the position shown in Fig. 34, while the material C is forced upwardly into and substantially filling the mold cavity M42.

When the mold is opened the articles C, together with the cast-in sleeves M43 are removed therefrom.

As shown in Figs. 35 to 37 inclusive, the articles C are formed between the plates M40 and additional plates M45 at the tops of the cavities. The mass of material C is deposited in an upper recess M46 above plate M45, and the material is forced thru a central restricted aperture in plate M45 when the charging head M14 is moved downwardly. Thus the head M14 forces a sufficient amount of material thru the plate M45 into the mold cavity and any surplus material, as at C1, will remain in the recess M46 around the head M14. Following a descent of head M14, and while the same is supported in its extended position downwardly, the plunger M15 is moved upwardly to a point slightly within the aperture of the plate M45, the size of said aperture and the pin M17 being substantially the same. When the mold is subsequently opened, the waste material C1 may be readily broken away from the molded articles C.

Fig. 37 shows the completion of a molding operation for such articles with the perforating pin M17 and head M14 retracted.

Figs. 38 and 39 show a modified form of means for molding the articles C in which the plunger M16 is employed for inserting bushings or sleeves M43 in the lower portions of the molded articles C, while pins P2 of the heads J are used in connection with the charging heads M14 for perforating the waste portions C1 of the molded articles to a point flush with the bottom of mold plate M45 so that when the mold is opened the waste portion may be readily detached from the completed article.

It will thus be understood that by the combined use of the perforating heads P and the plungers M16, or the combined use of said plungers and the charging heads M14, different forms of devices may be cast in the molds as shown or otherwise.

What I claim is:

1. A molding machine comprising a rotatable frame, a plurality of molds mounted thereon and arranged to be moved successively to and from charging position for receiving charges of material, plungers pivotally and reciprocably mounted on said frame adjacent said molds, means for swinging said plungers on their axes into and from registration with said molds preparatory and subsequent to the charging of the molds respectively, means for slidably moving said plungers into and from the molds for applying pressure to the material during a forming operation, perforating members axially alined with the molds and with said plungers for perforating the work, and means for reciprocably operating said perforating members.

2. A molding machine comprising a rotatable frame, a plurality of molds mounted thereon and arranged to be moved successively to and from charging position for receiving charges of material, plungers pivotally and reciprocably mounted on said frame adjacent said molds, means for swinging said plungers on their axes into and from registration with said molds preparatory and subsequent to the charging of the molds respectively, means for slidably moving said plungers into and from the molds for applying pressure to the material during a forming operation, perforating members axially alined with the molds and with said plungers for perforating the work, and means for reciprocably operating said perforating members while the work is subject to the pressure of said plungers.

3. A molding machine comprising a support, a mold mounted thereon for receiving material to be molded, a plunger pivotally and slidably mounted on said support adjacent said mold, said mold having a recess to receive the head of said plunger, said recess communicating with the mold cavity, means for swinging said plunger to and from registration with said mold, means for slidably moving said plunger into and from the mold for applying pressure to the charged material during a molding operation, a perforating member axially alined with the mold cavity and with said plunger, and means for slidably extending said member thru the material to be molded for perforating the work, as described.

4. A molding machine comprising a support, a mold mounted thereon for receiving material to be molded, a plunger pivotally and slidably mounted on said support adjacent said mold, said mold having a recess to receive the head of said plunger, said recess communicating with the mold cavity, means for swinging said plunger to and from registration with said mold, means for slidably moving said plunger into and from the mold for applying pressure to the charged material during a molding operation, a perforating member axially alined with the mold cavity and with said plunger, and means for slidably extending said member thru the material to be molded for perforating the work while said plunger is operatively extended into the mold recess.

5. A molding machine comprising a support, a mold mounted thereon for receiving material to be molded, a plunger pivotally and slidably mounted on said support adjacent said mold, said mold having a recess to receive the head of said plunger, said recess communicating with the mold cavity, means for swinging said plunger to and from registration with said mold, means for slidably moving said plunger into and from the mold for applying pressure to the charged material during a molding operation, a perforating member axially alined with the mold cavity and with said plunger, and means for slidably extending said member thru the material to be molded for perforating the work as described, said mold cavity having an inlet for the material, said perforating member having a portion thereof of but slightly less diameter than said inlet whereby the excess material is severed from the casting upon the operation of said perforating member.

6. A molding machine comprising a rotatable frame, a plurality of separable molds thereon, a stationary cam adjacent the path of said molds, lugs on the separable members of the molds, and locking devices adjacent said molds including toggle members engageable with said cam prior to a charging operation for locking the mold members together.

7. A molding machine comprising a rotatable frame, a plurality of separable molds thereon, a stationary cam adjacent the path of said molds, lugs on the separable members of the molds, and locking devices adjacent said molds including toggle members engageable with said cam prior to a charging operation for locking the mold members together, said toggle devices being operative for unlocking the molds successively as the toggle devices are disengaged from said cam.

8. A molding machine as characterized in claim 6, including means for yieldably supporting said cam to permit the movement of the cam when the molds cannot be completely closed due to the presence of particles of material between the members of the molds.

9. A molding machine comprising a rotatable frame, a plurality of molds mounted thereon, a charging plunger associated with each of said molds and reciprocable for applying pressure to the material in the mold cavities, and non-rotatable yieldable cams successively engageable with and for extending said plungers into the molds in a charging operation, and means for yieldably supporting said cams to prevent damage to the plungers when and if the molds should be over-charged with material.

10. A molding machine as characterized in claim 9, including means for pivotally and slidably mounting said plungers relative to the molds, whereby the plungers may be operatively and inoperatively positioned relative to the molds, respectively.

11. A molding machine comprising a rotatable frame, a plurality of molds thereon, a plurality of plungers pivotally and slidably mounted on said frame whereby the same may be moved into and from operative engagement with the molds, a pair of stationary cams mounted adjacent said frame and arranged one bove tne other for alternate engagement with and for extending said plungers into the molds subsequent to the charging of the molds, for the purpose described.

12. A molding machine comprising a mold, a support therefor, said mold having a cavity for receiving charges of material to be molded, means for applying pressure to said material subsequent to the charging operation, said cavity having an inlet for the material, a perforating member extensible into the mold cavity and said material to a predetermined point inwardly of said inlet while the pressure means is operative for filling the cavity with the material, means thereafter operative for extending said perforating member thru said inlet for severing the excess material from the material in the cavity, as described, and means for retracting said perforating member from the mold.

13. A molding machine as characterized in claim 12, including means operative on the retraction of said perforating member for forcing air under pressure into the mold and thru the perforation in the casting.

WILLIAM A. ANDERSON.